(12) United States Patent
Ecker et al.

(10) Patent No.: US 9,987,955 B2
(45) Date of Patent: Jun. 5, 2018

(54) MOTOR VEHICLE SEAT

(71) Applicant: Johnson Controls Components GmbH & Co. KG, Kaiserslautern (DE)

(72) Inventors: Roman Ecker, Trippstadt (DE); Dirk Dubois, Hinterweidenthal (DE); Jürgen Naßhan, Kaiserslautern (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 0 days. days.

(21) Appl. No.: 15/112,276

(22) PCT Filed: Jan. 20, 2015

(86) PCT No.: PCT/EP2015/050979
§ 371 (c)(1),
(2) Date: Jul. 18, 2016

(87) PCT Pub. No.: WO2015/107212
PCT Pub. Date: Jul. 23, 2015

(65) Prior Publication Data
US 2016/0332543 A1    Nov. 17, 2016

(30) Foreign Application Priority Data

Jan. 20, 2014 (DE) .......... 10 2014 200 939
May 15, 2014 (DE) .......... 10 2014 209 168

(51) Int. Cl.
*B60N 2/20* (2006.01)
*B60N 2/30* (2006.01)
(Continued)

(52) U.S. Cl.
CPC ......... *B60N 2/3093* (2013.01); *B60N 2/0232* (2013.01); *B60N 2/20* (2013.01);
(Continued)

(58) Field of Classification Search
CPC ...... B60N 2/20; B60N 2/3093; B60N 2/3065; B60N 2/3031; B60N 2/309
(Continued)

(56) References Cited

U.S. PATENT DOCUMENTS 4,695,094 A * 9/1987 Siebler ............... B60N 2/3011
297/331
5,165,753 A   11/1992 Henderson
(Continued)

FOREIGN PATENT DOCUMENTS

DE           10239112 A1 *  3/2004  ........... B60N 2/3031
DE         102005037405 A1    3/2006
(Continued)

OTHER PUBLICATIONS

English translation of DE 10239112 A1.*
(Continued)

*Primary Examiner* — Rodney B White
(74) *Attorney, Agent, or Firm* — The Dobrusin Law Firm, P.C.

(57) ABSTRACT

The invention relates to a motor vehicle seat comprising a seating part and a back rest, in which said seat part and the back rest can be adjusted from a user position into an access position and into a loading position.

20 Claims, 3 Drawing Sheets

(51) Int. Cl.
*B60N 2/36* (2006.01)
*B60N 2/02* (2006.01)

(52) U.S. Cl.
CPC ........... *B60N 2/309* (2013.01); *B60N 2/3031* (2013.01); *B60N 2/3065* (2013.01)

(58) Field of Classification Search
USPC ... 297/331, 334, 378.1, 335, 378.12, 378.14
See application file for complete search history.

(56) References Cited

U.S. PATENT DOCUMENTS

| | | | | |
|---|---|---|---|---|
| 5,588,707 A * | 12/1996 | Bolsworth | ........... | B60N 2/3013 297/334 X |
| 5,641,202 A * | 6/1997 | Rus | ........... | B60N 2/3013 297/335 X |
| 6,196,613 B1 * | 3/2001 | Arai | ........... | B60N 2/3031 297/334 X |
| 6,568,756 B2 * | 5/2003 | Sugimoto | ........... | B60N 2/305 297/334 X |
| 6,676,216 B1 | 1/2004 | Freijy et al. | | |
| 6,817,646 B2 * | 11/2004 | Kikuchi | ........... | B60N 2/01583 297/378.12 X |
| 6,899,392 B1 * | 5/2005 | Saberan | ........... | B60N 2/206 297/334 X |
| 7,014,260 B2 | 3/2006 | Moriyama et al. | | |
| 7,014,263 B2 * | 3/2006 | Mukoujima | ........... | B60N 2/22 297/334 X |
| 7,040,684 B2 * | 5/2006 | Tame | ........... | B60N 2/206 297/331 X |
| 7,152,921 B2 | 12/2006 | Saberan | | |
| 7,300,107 B2 * | 11/2007 | Kammerer | ........... | B60N 2/0292 297/334 X |
| 7,328,929 B2 * | 2/2008 | Epaud | ........... | B60N 2/3009 297/331 X |
| 7,413,251 B2 * | 8/2008 | Link | ........... | B60N 2/0705 297/334 |
| 7,419,218 B2 * | 9/2008 | Holdampf | ........... | B60N 2/3031 297/336 |
| 7,497,517 B2 * | 3/2009 | Gundall | ........... | B60N 2/206 297/334 X |
| 8,066,326 B2 * | 11/2011 | Hurst, III | ........... | B60N 2/3031 297/334 X |
| 8,251,450 B2 * | 8/2012 | Carroll | ........... | B60N 2/01583 297/334 X |
| 8,256,844 B2 * | 9/2012 | Yamazaki | ........... | B60N 2/0705 297/334 |
| 8,267,457 B2 * | 9/2012 | Yamada | ........... | B60N 2/22 297/331 X |
| 8,474,910 B2 * | 7/2013 | Kammerer | ........... | B60N 2/12 297/334 X |
| 8,480,051 B2 * | 7/2013 | Muhlberger | ........... | B60N 2/3065 297/334 X |
| 8,496,294 B2 | 7/2013 | Holdampf et al. | | |
| 8,579,374 B2 * | 11/2013 | Epaud | ........... | B60N 2/3031 297/334 |
| 8,590,970 B2 * | 11/2013 | Takakura | ........... | B60N 2/062 297/331 |
| 8,602,495 B2 * | 12/2013 | Jeong | ........... | B60N 2/3013 297/334 |
| 8,882,197 B2 * | 11/2014 | Line | ........... | B60N 2/2356 297/331 |
| 8,911,017 B2 * | 12/2014 | Deptolla | ........... | B60N 2/3031 297/334 |
| 2002/0113480 A1 * | 8/2002 | Senseby | ........... | B60N 2/2358 297/378.1 |
| 2009/0001795 A1 * | 1/2009 | Homier | ........... | B60N 2/22 297/341 |
| 2009/0146477 A1 * | 6/2009 | Yamada | ........... | B60N 2/3011 297/354.1 |
| 2011/0037304 A1 * | 2/2011 | Kammerer | ........... | B60N 2/12 297/340 |
| 2013/0264854 A1 * | 10/2013 | Romer | ........... | B60N 2/12 297/317 |
| 2015/0115680 A1 * | 4/2015 | Mabashi | ........... | B60N 2/06 297/334 |
| 2015/0375643 A1 * | 12/2015 | Fisher | ........... | B60N 2/015 297/334 |
| 2016/0304010 A1 * | 10/2016 | Ecker | ........... | B60N 2/3031 |
| 2016/0339813 A1 * | 11/2016 | Dubois | ........... | B60N 2/0232 |

FOREIGN PATENT DOCUMENTS

| | | | | |
|---|---|---|---|---|
| DE | 102009037816 B3 | 10/2010 | | |
| EP | 1452384 A1 | 9/2004 | | |
| EP | 1526035 A2 * | 4/2005 | ........... | B60N 2/3013 |
| GB | 2386549 A | 9/2003 | | |
| WO | 2010051646 A1 | 5/2010 | | |

OTHER PUBLICATIONS

International Search Report and Written Opinion for international application No. PCT/EP2015/050979 dated Apr. 20, 2015.

* cited by examiner

MOTOR VEHICLE SEAT

PRIOR ART

The present invention relates to a vehicle seat having a seating part and a backrest, wherein the seating part and the backrest can fee adjusted from a use position into an entry position and into a loading position.

Vehicle seats of this kind are known from the prior art. In the use position, a vehicle occupant can occupy the seating part of the vehicle seat. In the entry position, the seating part and the backrest are adjusted in such a way that the entry space behind the vehicle seat is enlarged. In the loading position, the backrest is supposed to be arranged substantially in such a way that a flat loading surface is formed with the load space. Since the installation space conditions in most motor vehicles are very limited, a flat loading surface, in particular, is generally not available.

DISCLOSURE OF THE INVENTION

It was therefore the object of the present invention to make available a vehicle seat which does not have the disadvantages of the prior art. In particular, the intention was to make available a vehicle seat which is of relatively compact design in terms of installation space, allows single-handed operation when folding, provides as large possible a loading surface in the loading position, ensures a large entry space and can be implemented at low cost.

The object is achieved with a vehicle seat having a seating part and a backrest, wherein the seating part and the backrest can be adjusted from a use position into an entry position and a loading position, wherein the backrest is movably mounted on a foot and the seating part is supported on a front mounting and on the foot in the use position, and the front mounting and the foot can each to moved independently of one another and relative to the vehicle body.

The present invention relates to a vehicle seat for a motor vehicle. Vehicle seats of this kind have a seating part and a backrest. The vehicle seat can accommodate one or more persons. In its use position, the seating part is provided substantially horizontally, and the backrest is provided substantially vertically. From this use position, the seating part and the backrest can be moved into an entry position, on the one hand, and into a loading position, on the other hand. In the entry position, at least some parts of the vehicle seat are adjusted in such a way that the space behind the backrest of the vehicle seat is enlarged to facilitate the entry of vehicle occupants who wish to occupy the space behind the vehicle seat according to the invention. In the loading position, the backrest, in particular, is adjusted from the vertical to the horizontal to produce a flat loading surface with else load space of the vehicle, wherein the seating part, in particular, must not be in the way and is lowered for this purpose according to the present invention.

According to the invention, the backrest of the vehicle seat is now movably, in particular pivotably, mounted on a foot. This movement is also preferably used for "comfort adjustment" in order to adapt the backrest to the physiognomy of the seat occupant. In its use position, the seating part is supported in its front region on a front mounting, in particular a rocker arm, and in its rear region on the foot, on which the backrest is also provided. Also according to the invention, the front mounting and the foot can each be moved independently of one another and relative to the vehicle body. As a result, very compact construction is possible and the seating part can be moved into the respectively desired position independently of the backrest.

Advantageous embodiments and developments of the invention can be found in the dependent claims and the description with reference to the drawings.

In its rear region, in which the buttocks of the seat occupant are located, the seating part preferably has a guide means, e.g. a pin, which interacts with a guide, e.g. a guide slot, which is provided on the foot, and is moved along this guide slot, e.g. can be moved linearly. This makes it possible to move the seating part independently of the foot.

According to another embodiment of the present invention, provision is made for the guide to have an opening via which the guide means leaves the guide during transfer of the vehicle seat from the use position into the loading or entry position. In particular, the guide slot has a guide slot opening, e.g. on the upper side thereof, via which the pin leaves the slotted guide for the occupation of the entry position. Moreover, provision is preferably made for the guide means to be arranged in the region of the opening, in particular directly below the opening, in the use position. It is thereby possible, without major additional effort, to ensure that the guide means leaves the guide when the vehicle seat is supposed to be transferred into the loading position. Provision is furthermore made for the pin to be arranged outside the guide slot in the entry position and within the guide slot in the use and loading positions.

Preferably, both the front mounting and the foot are connected to a longitudinal adjuster, e.g. a rail system, having a top rail and a bottom rail. Here, both the front mounting and the mounting of the foot are preferably each embodied by means of a rocker arm, which is provided in the form of a lever, wherein a pivot bearing is provided at both ends of the lever. One end of the rocker arm in each case is connected co the vehicle body or the longitudinal adjuster, and the other end of the rocker arm is connected to the vehicle seat according to the invention.

The foot of the vehicle seat is preferably supported by means of two supports, in particular two rocker arms, which, in particular, engage at two different points on the foot and, particularly preferably, at two different points on the longitudinal movement system or the vehicle body.

A drive element, e.g. an electric motor or a pneumatic or hydraulic drive, is preferably provided on the seating part and/or on the front mounting, which drive element can adjust the seating part, in particular, relative to the front mounting and can thereby particularly preferably move the front seating part from its use position into an entry position and/or loading position. As a particularly preferred option, however, the drive element also moves the front mounting relative to the vehicle body.

According to another embodiment of the present invention, provision is made for the drive element to be coupled to a front rocker arm, which is articulated pivotably to the seating part, on the one hand, and pivotably to a rail system of the vehicle seat or a body floor of the vehicle, on the other hand. In particular, the drive element is configured in such a way that an angle of inclination of the front rocker arms can be adjusted. Provision is furthermore made to enable the guide means to be decoupled from the guide by means of the drive element. For example, the pin is lifted out of the slotted guide by means or the drive element when the vehicle seat is to be transferred into the entry position. Provision is furthermore preferably made for an angle of inclination between the front rocker arm and the seating pare to be adjustable by the drive means. In particular, the front rocker arm assumes a different angle of inclination relative to the seating part in the entry position, in the use position and in the load position respectively. In this case, the angle of inclination in the entry position is preferably larger than the angle of inclination in the use position, wherein the angle of inclination in the use position is, in turn, preferably larger than the angle of inclination in the storage position. Provision is furthermore made for the vehicle seat to be configured in such a way that the seat element can be lowered by means of the drive element in the loading position as compared with the seat element in the entry position and the use position.

The present invention furthermore relates to a vehicle having the vehicle seat according to the invention.

Further details, features and advantages of the invention will become apparent from the drawings and from the following description of preferred embodiments with reference to the drawings. Here, the drawings merely show illustrative embodiments of the invention, which do not restrict the essential concept of the invention.

EMBODIMENTS OF THE INVENTION

In the various figures, identical parts are in all cases provided with identical reference signs and are therefore also generally named or mentioned only once in each case.

Figure 1A:
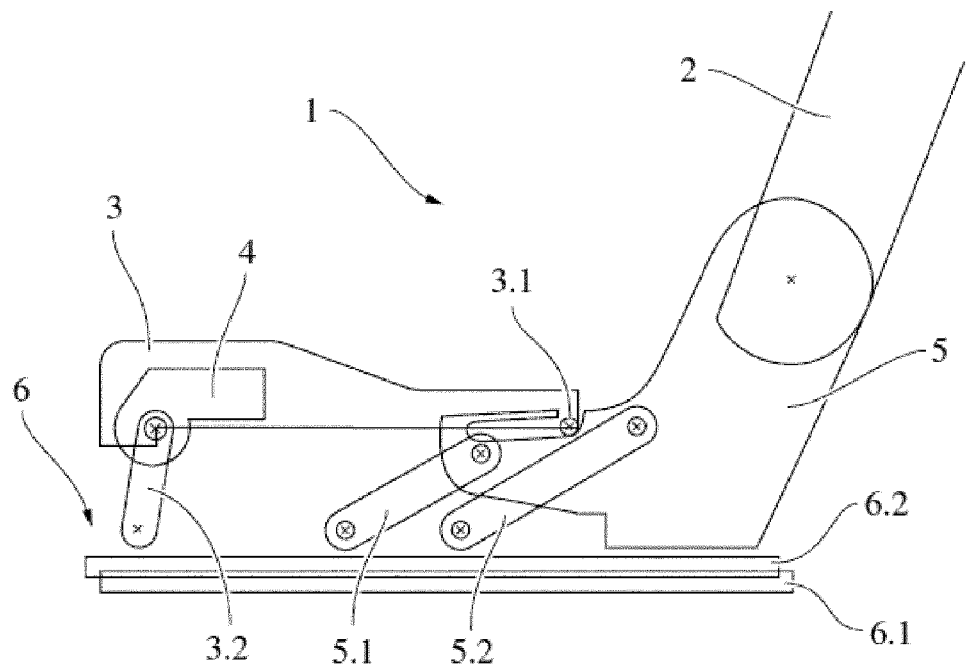
FIGS. 1a-1c show a first embodiment of the vehicle seat according to the invention.
Figure 1B:
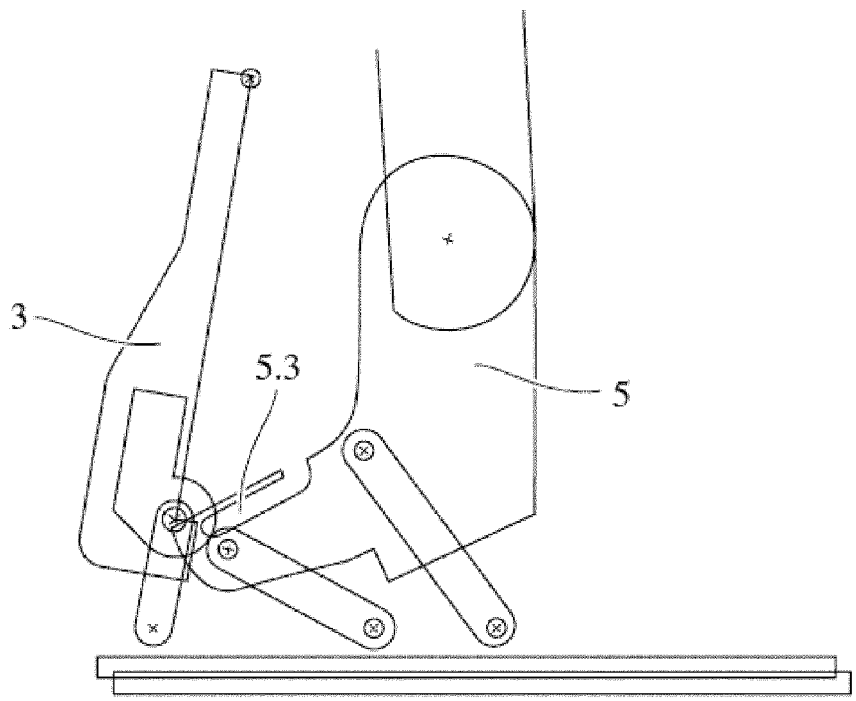
Figure 1C:
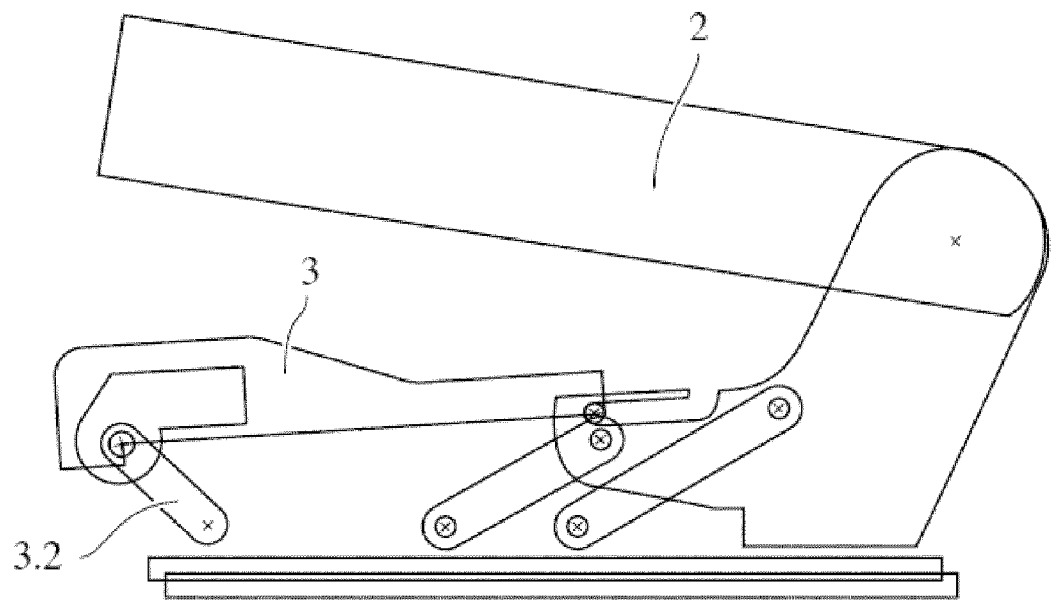

FIGS. 1a to 1c show a first embodiment of the vehicle seat 1 according to the invention. This seat comprises a backrest 2 and a seating part 3. The backrest is supported movably, in this case pivotably, on a foot 5 which, for its part, with a longitudinal adjuster 6 which, in the present case, consists of a bottom rail 6.1 firmly connected to the body of the vehicle and of a top rail 6.2 that can be adjusted relative to the bottom rail 6.1. In its front region, the "thigh support", the seating part 3 has a front support 3.2, which is connected to the seating part 3, on the one hand, and likewise to the longitudinal adjustment system of the vehicle seat 1, on the other hand. In its rear region, in which the buttocks of the seat occupant are located, the seating part 3 is likewise supported on the foot 5. The foot 5 is connected to the longitudinal adjustment system 6, in the present case by means of two mountings, the central mounting 5.1 and the rear mounting 5.2. In the present case, both the front mounting 3.2 and the central and rear mountings 5.1, 5.2 are provided as rocker arms in each case, each having a lever which has a pivot bearing at its first end and its second end. In the case of the front rocker arm 3.2, one pivot bearing is connected to the seating part 3 and the other pivot bearing is connected to the longitudinal adjustment system 6. In the case of the central and rear rocker arms 5.1, 5.2, one pivot bearing in each case is connected to the foot 5 and the other pivot bearing in each case is connected to the longitudinal adjustment system 6. A person skilled in the art will understand that the mountings 3.2, 5.1 and 5.3 can also be connected directly to the vehicle body in the event that the vehicle seat according to the invention does not have a longitudinal adjustment system. In its rear region, the seating part 3 in the present case has a guide/mounting means 3.1, e.g. a pin, which, in the present case, engages in a guide 5.3, here a guide slot, in the use position of the vehicle seat 1, said guide on the one hand guiding and/or supporting the guide means 3.1 but also allowing a relative movement between the seating part 3 and the foot 5. The guide 5.3 and/or the guide means 3.1 are preferably provided in such a way that the connection between the rear part of the seating part 3 and the foot 5 can optionally be released. A drive 4, here an electric motor, is preferably provided in the front region of the seating part 3, with which drive it is possible to adjust the seating part 3 relative to the front mounting 3.2 and/or the front mounting 3.2 relative to the body of the vehicle.

FIG. 1a shows the vehicle seat 1 in its "use position", in which a vehicle occupant can occupy the vehicle seat 1.

FIG. 1b shows the "entry position". For this purpose, the connection between the seating part 3 and the foot is released, and the seating part 3 can be moved from its substantially horizontal position into a vertical position, for example by means of the motor 4. After this, the connection between the foot 5 and the longitudinal adjustment system is partially released, and the foot 5 can be pivoted, in this case counterclockwise, into the space vacated by the sealing part. This creates more space behind the vehicle seat 1 according to the invention, giving the seat occupants occupying the row of seats behind the vehicle seat according to the invention more space to enter.

FIG. 1c shows the vehicle seat 1 according to the invention in its "loading position", in which the backrest 2 is provided so as to be substantially horizontal. For this purpose, the front mounting 3.2 is first of ail pivoted clockwise, as a result of which the seating part 3, in particular the front region thereof, is lowered, on the one hand, but is also moved to the left, away from the foot 5. During this process, the rear region of the seating part 3 is moved along the guide slot 5.3, and the movement is limited by the guide slot. This lowering and movement of the seating part 3 means that there is more space available for the backrest 2, allowing the latter to be made at least approximately horizontal and thus level with respect to the remainder of the load space.

Figure 2A:
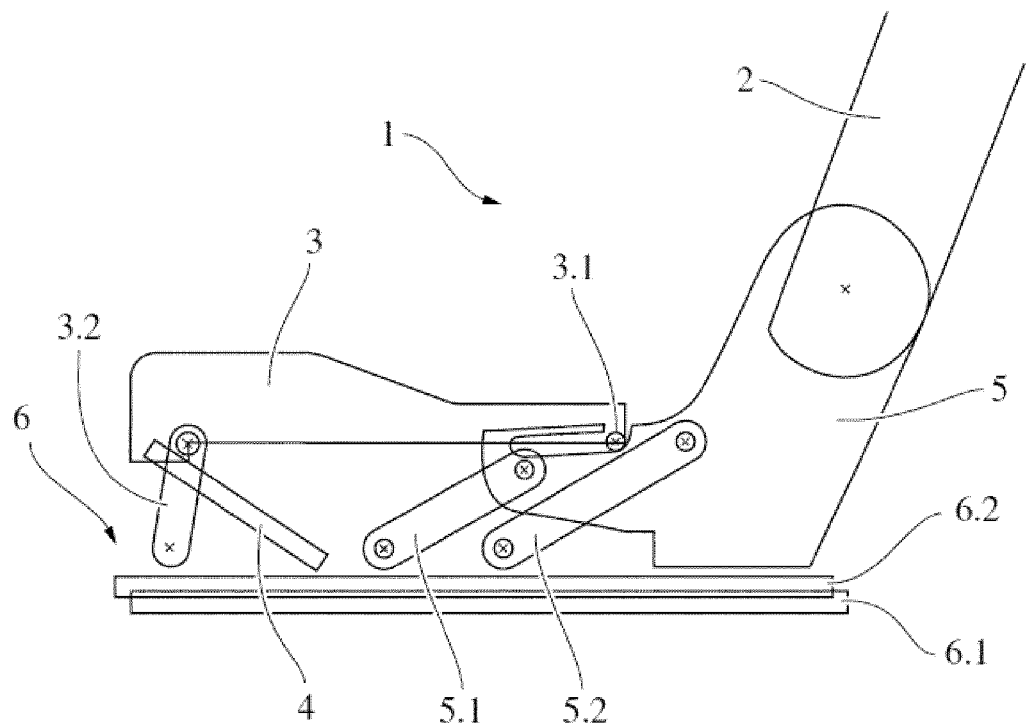
FIGS. 2a-2c show a second embodiment of the vehicle seat according to the invention.
Figure 2B:
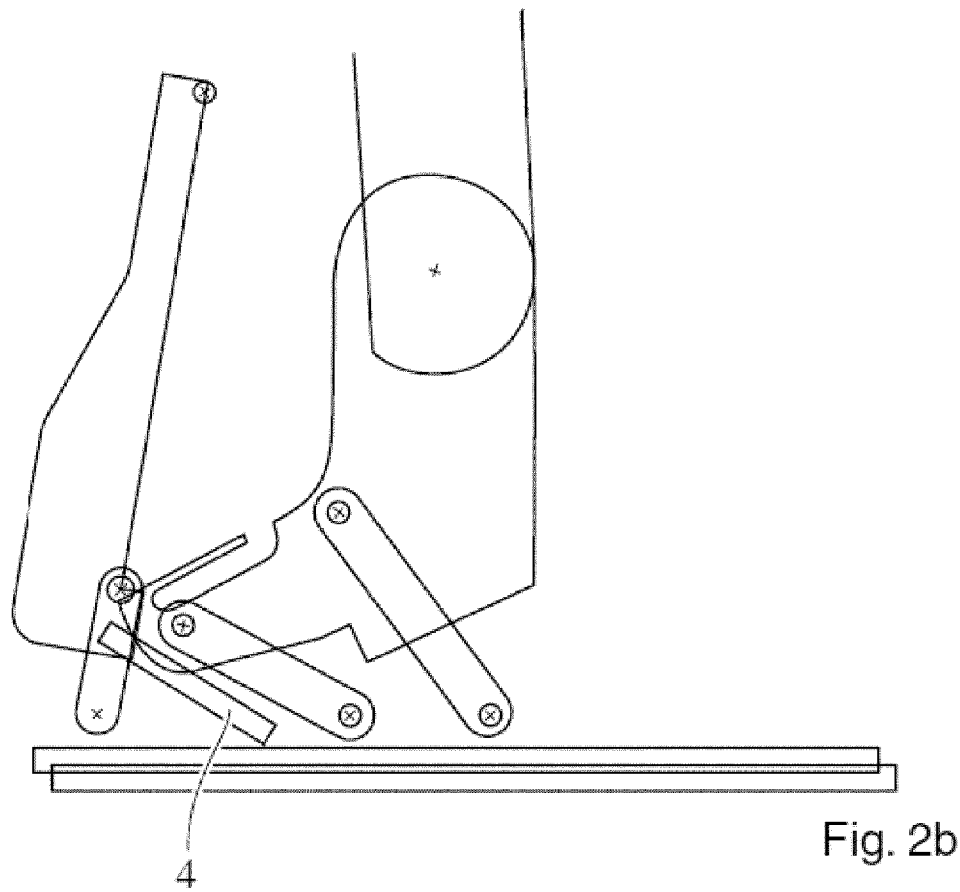
Figure 2C:
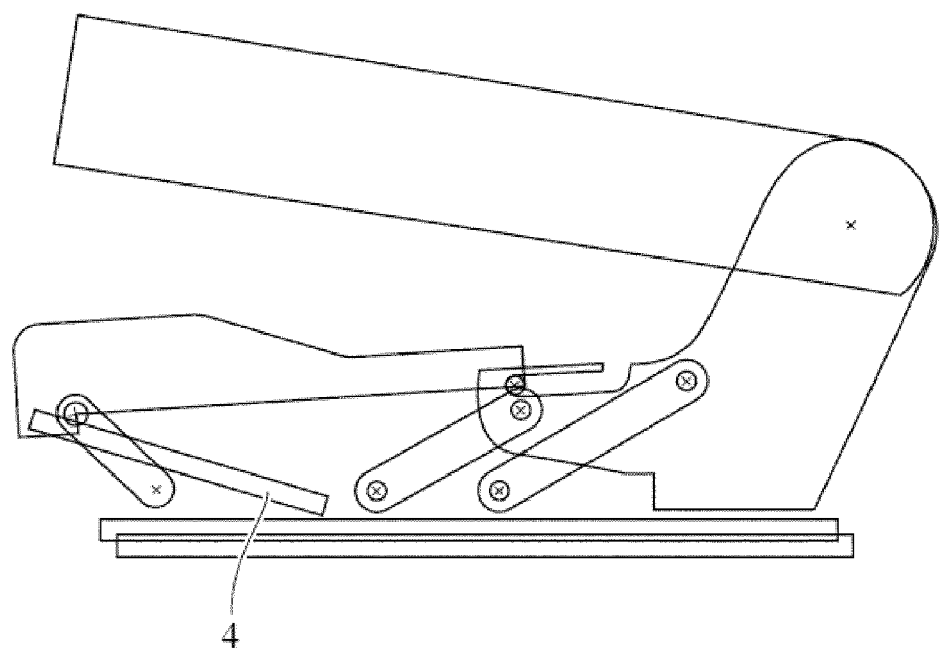

FIGS. 2a to 2c show another embodiment of the vehicle seat 1 according to the invention. Essentially, reference may be made to the statements made with respect to FIGS. 1a-1c but, in the present case, the electric motor has been replaced by a linear drive, in particular a pneumatic or hydraulic drive. This drive 4 is provided between the longitudinal adjustment system 6 and the seating part 3 and, on the one hand, can pivot the latter relative to the mounting 3.2. However, as an alternative or in addition, the drive 4 can also be used to pivot the front mounting 3.2 relative to the longitudinal adjustment system. Here too, a person skilled in the art will recognize that a longitudinal adjustment system is not absolutely necessary; instead, the front mounting 3.2 and the foot 5 can also be connected directly to the vehicle body.

LIST OF REFERENCE SIGNS 1 vehicle seat
2 backrest
3 seating part
3.1 guide means
3.2 front mounting, rocker arm
4 drive element, motor
5 foot
5.1 central mounting, rocker arm
5.2 rear mounting, rocker arm
5.3 guide, guide slot
6 longitudinal adjuster
6.1 bottom rail
6.2 top rail

The invention claimed is:

1. A motor vehicle seat having a seating part and a backrest,
wherein the seating part and the backrest can be adjusted into a use position, an entry position, and a loading position,
wherein the vehicle seat comprises a foot and a front mounting, wherein the backrest is movably mounted on the foot,
wherein the seating part is supported both on the front mounting and on the foot in the use position and wherein the front mounting and the foot can each be moved independently of one another and relative to a vehicle body,
wherein a drive element is arranged on the seating part and on the front mounting, wherein the drive element is provided for adjusting the seating part relative to the front mounting in order to move the seating part between the use position, the entry position, and the loading position,
wherein the seating part has a guide means in its rear region which engages in a guide in the use position of the vehicle seat,
wherein the guide guides and/or supports the guide means,
wherein the guide and/or the guide means are provided in such a way that a connection between a rear part of the seating part and the foot can optionally be released.

2. The vehicle seat as claimed in claim 1, wherein the front mounting comprises a rocker arm.

3. The vehicle seat as claimed in claim 1, wherein the backrest is pivotably mounted on the foot.

4. The vehicle seat as claimed in claim 1, wherein the seating part has in its rear region a pin which interacts with the guide.

5. The vehicle seat as claimed in claim 4, wherein the guide comprises a guide slot and wherein the pin interacts with the guide slot and can be moved linearly along the guide slot.

6. The vehicle seat as claimed in claim 1, wherein both the front mounting and the foot are connected to a longitudinal adjuster.

7. The vehicle seat as claimed in claim 6, wherein the longitudinal adjuster has a bottom rail fixed to the vehicle body and a top rail, which can be moved relative to the bottom rail, wherein the front mounting and the foot are each attached by a pivot joint to the top rail.

8. The vehicle seat as claimed in claim 7, wherein the foot is mounted so as to be pivotable relative to the vehicle body by means of a second rocker arm, wherein the second rocker arm is mounted both pivotably on the foot and pivotably on the top rail.

9. The vehicle seat as claimed in claim 8, wherein the foot is supported by means of a third rocker arm, and the second rocker arm and the third rocker arms engage at two different points on the foot and at two different points on the top rail.

10. The vehicle seat as claimed in claim 9, wherein the drive element comprises an electric motor, a pneumatic drive and/or a hydraulic drive.

11. A vehicle having a vehicle seat as claimed in claim 1.

12. The vehicle seat as claimed in claim 1, wherein the drive element comprises an electric motor, a pneumatic drive and/or a hydraulic drive.

13. A motor vehicle seat having a seating part and a backrest,
wherein the seating part and the backrest can be adjusted into a use position, an entry position, and a loading position,
wherein the vehicle seat comprises a foot and a front mounting, wherein the backrest is movably mounted on the foot,
wherein the seating part is supported both on the front mounting and on the foot in the use position and wherein the front mounting and the foot can each be moved independently of one another and relative to a vehicle body,
wherein a drive element is arranged on the seating part and on the front mounting, wherein the drive element is provided for adjusting the seating part relative to the front mounting in order to move the seating part between the use position, the entry position, and the loading position,
wherein the seating part has in its rear region a pin which interacts with a guide.

14. The vehicle seat as claimed in claim 13, wherein the guide comprises a guide slot and wherein the pin interacts with the guide slot and can be moved linearly along the guide slot.

15. The vehicle seat as claimed in claim 13, wherein both the front mounting and the foot are connected to a longitudinal adjuster.

16. The vehicle seat as claimed in claim 15, wherein the longitudinal adjuster has a bottom rail fixed to the vehicle body and a top rail, which can be moved relative to the bottom rail, wherein the front mounting and the foot are each attached by a pivot joint to the top rail.

17. The vehicle seat as claimed in claim 16, wherein the foot is mounted so as to be pivotable relative to the vehicle body by means of a second rocker arm, wherein the second rocker arm is mounted both pivotably on the foot and pivotably on the top rail.

18. The vehicle seat as claimed in claim 17, wherein the foot is supported by means of a third rocker arm, and the second rocker arm and the third rocker arm engage at two different points on the foot and at two different points on the top rail.

19. The vehicle seat as claimed in claim 18, wherein the drive element comprises an electric motor, a pneumatic drive and/or a hydraulic drive.

20. The vehicle seat as claimed in claim 13, wherein the drive element comprises an electric motor, a pneumatic drive and/or a hydraulic drive.

* * * * *